US005638195A

United States Patent [19]
Katakura et al.

[11] Patent Number: 5,638,195
[45] Date of Patent: Jun. 10, 1997

[54] LIQUID CRYSTAL DISPLAY DEVICE FOR IMPROVED HALFTONE DISPLAY

[75] Inventors: Kazunori Katakura, Atsugi; Yutaka Inaba, Kawaguchi, both of Japan

[73] Assignee: Canon Kabushiki Kaisha, Tokyo, Japan

[21] Appl. No.: 361,050

[22] Filed: Dec. 21, 1994

[30] Foreign Application Priority Data

Dec. 21, 1993 [JP] Japan ................... 5-346521
Dec. 21, 1993 [JP] Japan ................... 5-346522
Dec. 28, 1993 [JP] Japan ................... 5-351580

[51] Int. Cl.$^6$ ............................. G02F 1/1343
[52] U.S. Cl. ............................. 349/143; 349/37
[58] Field of Search .................. 359/56, 84, 87, 359/54; 345/97, 96, 101, 147, 149, 89

[56] References Cited

U.S. PATENT DOCUMENTS

| | | | |
|---|---|---|---|
| 4,655,561 | 4/1987 | Kanbe et al. | 350/350 S |
| 4,697,887 | 10/1987 | Okada et al. | 350/350 S |
| 4,709,995 | 12/1987 | Kuribayashi et al. | 350/350 S |
| 4,712,877 | 12/1987 | Okada et al. | 359/87 |
| 4,776,676 | 10/1988 | Inoue et al. | 359/56 |
| 4,800,382 | 1/1989 | Okada et al. | 340/784 |
| 4,836,656 | 6/1989 | Mouri et al. | 350/350 S |
| 4,932,759 | 6/1990 | Toyono et al. | 350/350 S |
| 4,938,574 | 7/1990 | Kaneko et al. | 359/56 |
| 5,058,994 | 10/1991 | Mihara et al. | 359/56 |

FOREIGN PATENT DOCUMENTS

| | | |
|---|---|---|
| 61-9623 | 1/1986 | Japan. |
| 5134236 | 5/1993 | Japan. |
| 5158444 | 6/1993 | Japan. |

Primary Examiner—William L. Sikes
Assistant Examiner—James A. Dudek
Attorney, Agent, or Firm—Fitzpatrick, Cella, Harper & Scinto

[57] ABSTRACT

A display device is constituted by a pair of oppositely disposed substrates spaced from each other and having thereon scanning electrodes and data electrodes intersecting the scanning electrodes, respectively, and a layer of optical modulation substance, e.g., a liquid crystal disposed between the substrates so as to form a pixel at each intersection of the scanning electrodes and data electrodes and so that a white display region and a black display region can be formed at a varying areal ratio therebetween in each pixel. In the device, a site forming a nucleus of a black display region in one pixel and a site forming a nucleus of a white display region in another pixel adjacent to said one pixel are disposed to be adjacent to each other. As a result, a halftone display can be effected according to the areal method using a cell having a simple thickness gradient while avoiding appearance of ugly continuous lines diminishing a halftone display effect. The device is also suitable for a temperature compensation according to the pixel shift method.

23 Claims, 16 Drawing Sheets

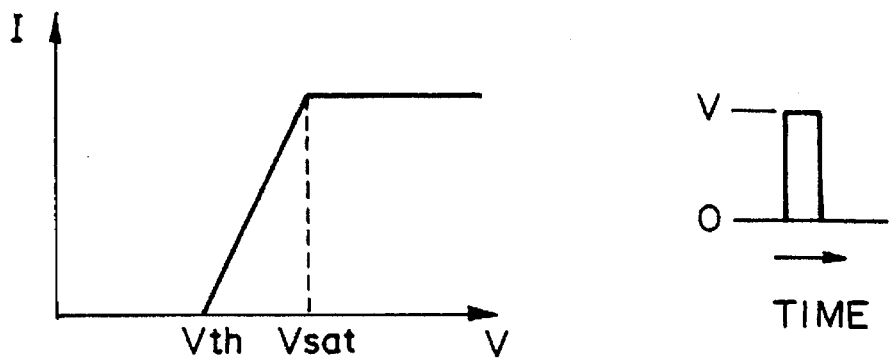
FIG. IA
PRIOR ART
FIG. IB
PRIOR ART
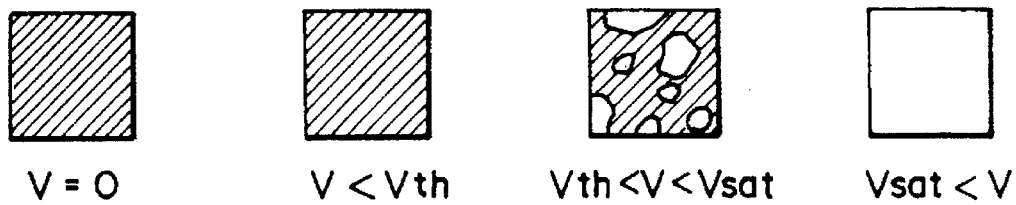
FIG. 2A
PRIOR ART
FIG. 2B
PRIOR ART
FIG. 2C
PRIOR ART
FIG. 2D
PRIOR ART

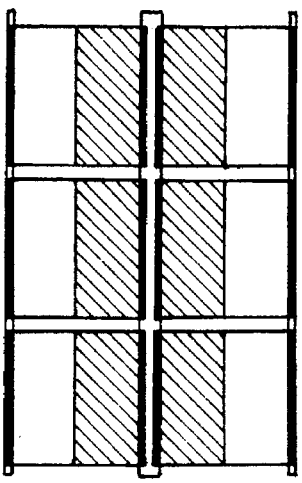
FIG. 4C
PRIOR ART
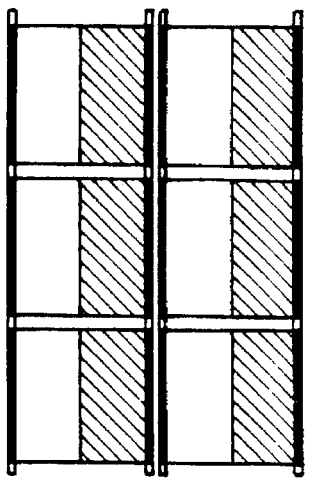
FIG. 4E
PRIOR ART
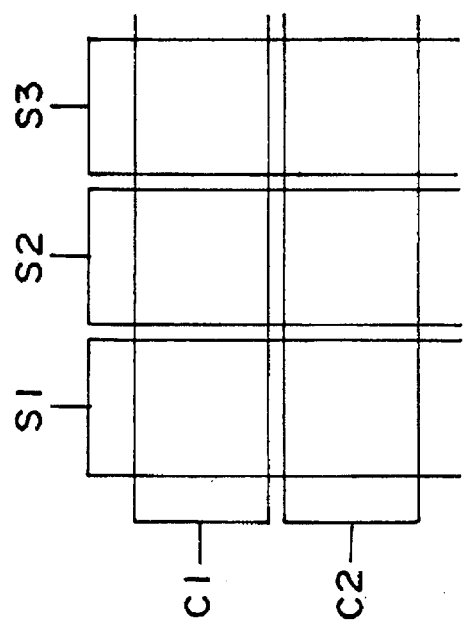
FIG. 4B
PRIOR ART
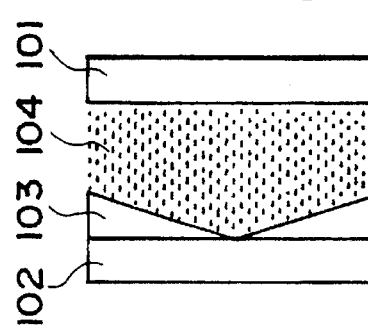
FIG. 4A
PRIOR ART
FIG. 4D
PRIOR ART

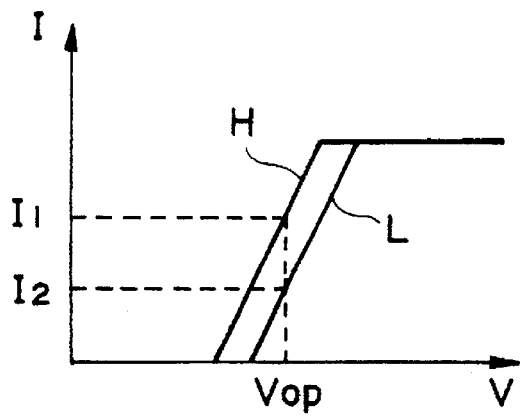
FIG. 8
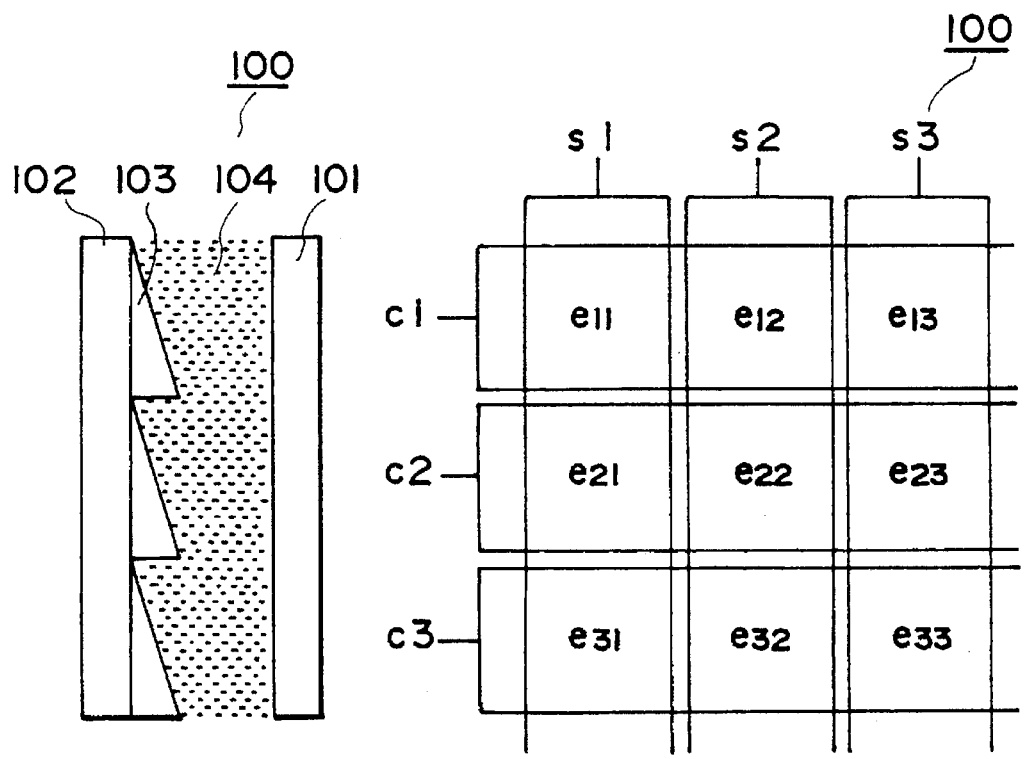
FIG. 9A
PRIOR ART
FIG. 9B
PRIOR ART

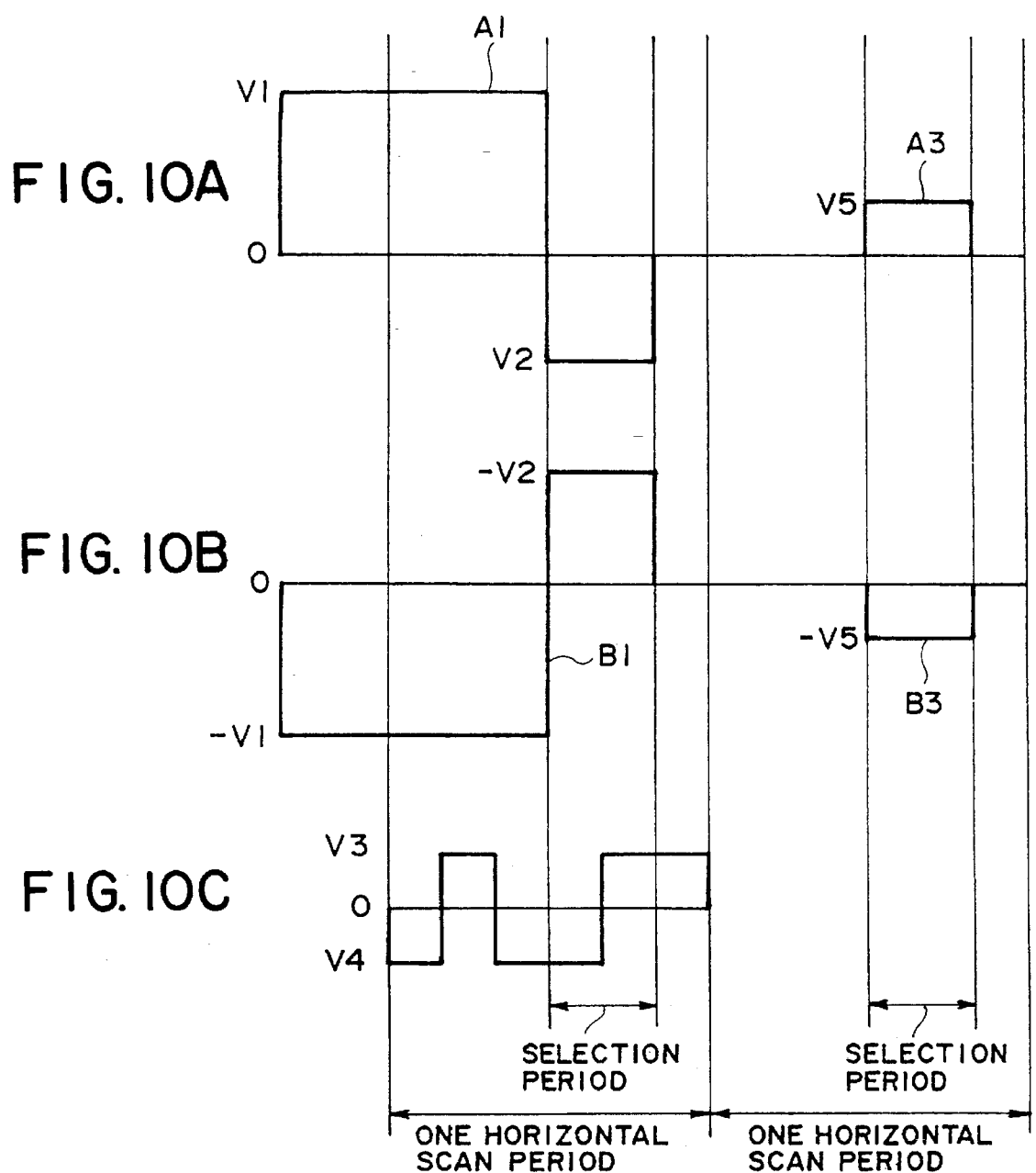

SELECTION PERIOD | SELECTION PERIOD | SELECTION PERIOD

ONE HORIZONTAL SCAN PERIOD

FIG. 16G  C1a-S1a 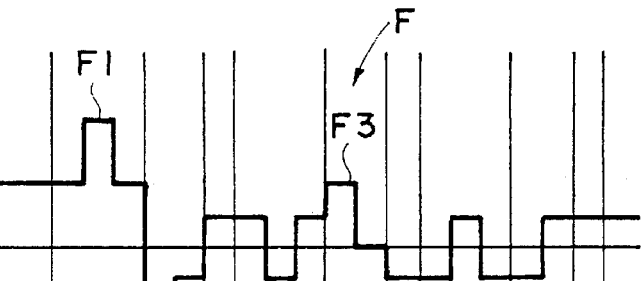
FIG. 16H  C2a-S1a 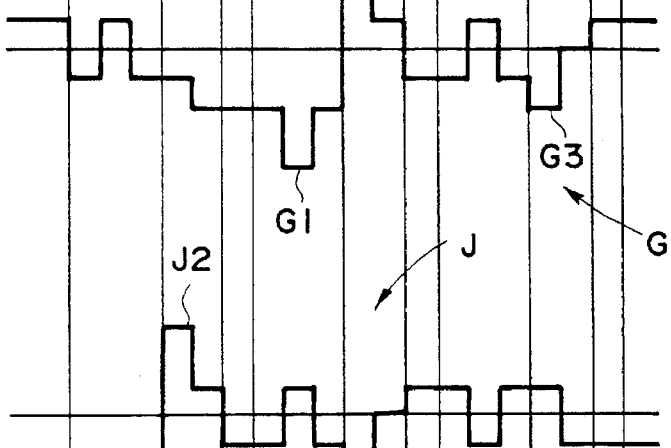
FIG. 16I  C1b-S1b 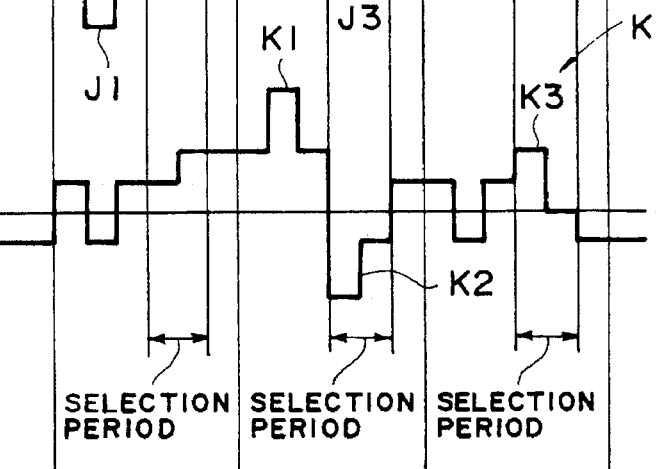
FIG. 16J  C2b-S1b 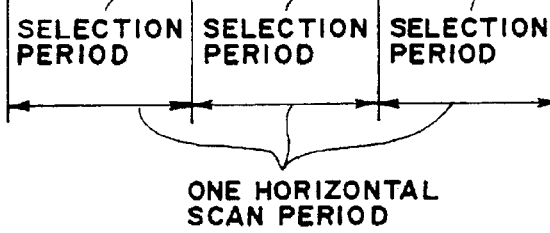
SELECTION PERIOD | SELECTION PERIOD | SELECTION PERIOD
ONE HORIZONTAL SCAN PERIOD

LIQUID CRYSTAL DISPLAY DEVICE FOR IMPROVED HALFTONE DISPLAY

FIELD OF THE INVENTION AND RELATED ART

The present invention relates to a display device for use in an image data processing apparatus, such as a terminal monitor for a computer, a view finder for a video camera recorder (cam-corder), a light-valve for an image projector and a television receiver; particularly a display device capable of a halftone display.

There have been well-known a type of display devices comprising a group of scanning electrodes and a group of data electrodes constituting an electrode matrix, and a liquid crystal compound disposed therebetween so as to form a large number of pixels each at an intersection of the scanning electrodes and data electrodes, thereby effecting image data display. Among these, a chiral smectic (ferroelectric) liquid crystal display apparatus having bistability and a quick responsiveness to an electric field is expected achieve widespread use as a high-speed and memory-type display device. For example, Japanese Laid-Open Patent Application (JP-A) 61-9623 discloses a liquid crystal display device comprising a pair of glass substrates each having transparent electrodes thereon, provided with an aligning treatment and disposed opposite to each other to leave a cell gap of 1–3 μm therebetween, and a chiral smectic (ferroelectric) liquid crystal disposed to fill the cell gap. A large number of practical methods for matrix-driving such a liquid crystal display device have also been disclosed, e.g., in U.S. Pat. Nos. 4,655,561, 4,709,995, 4,800,382, 4,836,656, 4,932,759, 4,938,574 and 5,058,994.

As a method for displaying a halftone in such a liquid crystal display device, there has been known an areal modulation method (areal gradation method). This is based on a relationship as shown in FIGS. 1A and 1B between a voltage pulse amplitude (switching pulse amplitude) V applied to a liquid crystal pixel formerly placed in a dark state and a transmitted light quantity I in a chiral smectic liquid crystal device. More specifically, (1) in case where the pulse amplitude V is below a threshold voltage Vth (V<Vth), the pixel retains a complete light-interrupting state (black) (FIGS. 1A, 2A and 2B). (2) In case where the pulse amplitude V is in the range of Vth<V<Vsat (Vsat: saturation voltage), a part of the pixel retains the interrupting state but the other part is changed to a light-transmission state (white), to display a halftone as a whole pixel (FIG. 2C). (3) In case where the pulse amplitude V is larger than the saturation value Vsat (V>Vsat), the whole pixel assumes a light transmission state (FIG. 2D) whereby the transmitted light quantity assumes a constant value regardless of the pulse amplitude (FIG. 1A).

Accordingly, by appropriately controlling the pulse amplitude V in the range of Vth<V<Vsat, it is possible to control the areal ratio between bistable states (areal ratio between a white display region and a black display region), thereby forming an intermediate light transmission state.

In order to effect an accurate halftone display according to such an areal modulation method, it is advisable to provide a milder threshold gradient (slope), and this may be accomplished by methods, such as (a) formation of a potential gradient in a pixel to effect a gradational display (potential gradient method), (b) surface treatment of a substrate, and (c) a cell thickness gradient method. The cell thickness gradient method is frequently utilized because of various advantages such that substantially no heat evolution is caused and the gradient shape can be stable for all the pixels.

In a liquid crystal display device used in the cell thickness gradient method, as shown in FIG. 3A, each pixel is provided with a gradient forming layer 103 of, e.g., a UV-cured resin, formed on one substrate 102 so as to provide a thickness gradient of a liquid crystal layer 104, whereby an areal ratio between bistable states (white and black display regions) to effect a halftone display (FIGS. 3B–3F).

In order to effect a halftone display according to the above-mentioned cell thickness gradient method, it is necessary to dispose such a sloped UV-cured resin layer 103 at each pixel. The disposition may be performed in various manners such that (i) the UV-cured resin layer 103 is disposed so as to form symmetrical gradients at adjacent pixels (FIG. 4A), and (ii) the UV-cured resin layer 103 is disposed in a saw-tooth shape so as to provide a gradient in a constant direction at the respective pixels (FIG. 4D). FIG. 4B is a plan view showing corresponding arrangement and connection of scanning electrodes C1, C2, . . . and data electrodes S1, S2, . . . .

In operation, in the disposition (i), when the scanning electrodes C1 and C2 are supplied with a scanning signal having a waveform as shown at A of FIG. 5 (hereinbelow referred to as "scanning signal A") including a sequence of a black reset pulse and a white selection pulse and data electrodes S1–3 are supplied with a 50%-halftone data signal waveform as shown at C of FIG. 5, a white display is formed at a region of a smaller liquid crystal layer thickness in the respective pixels, whereby a display state as shown at FIG. 4C is formed as a whole in the liquid crystal display device. As a result, while each pixel displays a 50%-halftone, the black display portions and the white display portions are respectively connected to form stripes, and the liquid crystal display device appears to display horizontal lines when viewed from a position close thereto, so that the resultant display state cannot be recognized as a halftone display state. For example, in case of a liquid crystal display device having a pixel size of 300 μm×300 μm, the above difficulty is noticeable when viewed from a position within 30 cm distant from the device.

Further, in the above-mentioned disposition (ii) of the UV-cured resin layer 103 shown in FIG. 4D, when the scanning electrode C1 is supplied with the above-mentioned scanning signal A and the scanning electrode C2 is supplied with a scanning signal having a waveform as shown at B in FIG. 5 simultaneously with the application of a 50%-halftone data signal as shown at C of FIG. 5, a display state as shown at FIG. 4E results, providing a similar difficulty.

The above difficulty may be alleviated if a plurality of concavities are formed within a pixel to provide a complex threshold gradient as proposed in JP-A 5-134236. In this case, however, a higher accuracy is required in a production step compared with the case of providing a simple cell thickness gradient, and the projections and edges of the concavities are liable to be deformed, so that the production yield is liable to be lowered.

SUMMARY OF THE INVENTION

In view of the above-mentioned problem of the prior art, an object of the present invention is to provide a display device capable of displaying a good halftone display even when viewed from a small distance by arranging the scanning electrodes in appropriate shapes to be supplied with appropriate polarities of pulses.

According to the present invention, there is provided a display device comprising: a pair of oppositely disposed substrates spaced from each other and having thereon a group of scanning electrodes and a group of data electrodes intersecting the scanning electrodes, respectively, and a layer of optical modulation substance disposed between the scanning electrodes and data electrodes so as to form a pixel at each intersection of the scanning electrodes and data electrodes and so that a white display region and a black display region can be formed at a varying areal ratio therebetween in each pixel, thus allowing a halftone display at the pixel;

wherein a site forming a nucleus of a black display region in one pixel and a site forming a nucleus of a white display region in another pixel adjacent to said one pixel are disposed to be adjacent to each other.

In the display device of the present invention, a site of a black (dark) display region in a particular pixel and a site of a white (bright) display region in another pixel adjacent to the particular pixel are disposed to be adjacent to each other, thereby preventing sites of nuclei forming black display regions (or white display regions) from being contiguous to each other, so that a black or white display does not extend continuously like a stripe when a display device, particularly a liquid crystal display device, is driven for halftone display.

In this instance, it is preferred that a wiring shape of a scanning electrode and a pulse polarity applied to the scanning electrode are appropriately designed so that different polarities of pulses are applied to scanning electrodes for adjacent pixels.

It is preferred that mutually adjacent pixels can be provided with an identical threshold gradient.

It is also preferred that each pixel is provided with a continuously varying liquid crystal layer thickness so as to have a monotonously increasing threshold gradient in one direction.

It is preferred that the optical modulation substance is a liquid crystal, particularly a chiral smectic liquid crystal preferably having a ferroelectricity.

These and other objects, features and advantages of the present invention will become more apparent upon a consideration of the following description of the preferred embodiments of the present invention taken in conjunction with the accompanying drawings, wherein like parts are denoted by like reference numerals.

BRIEF DESCRIPTION OF THE DRAWINGS

FIGS. 1A and 1B are graphs illustrating a relationship between switching pulse voltage and a transmitted light quantity contemplated in a conventional areal modulation method.

FIGS. 2A-2D illustrate pixels showing various transmittance levels depending on applied pulse voltages.

FIGS. 4A-4E are views for illustrating problems accompanying the cell thickness gradient method, of which FIG. 4A and 4D are sectional views showing examples of liquid crystal display devices having different sectional structures; FIG. 4B is a plan view showing an electrode arrangement; and FIGS. 4C and 4E are plan views showing 50% halftone display states of the devices of FIGS. 4A and 4D, respectively.

FIGS. 7A-7C are views for illustrating an embodiment, wherein FIG. 7A is a sectional view of vertically adjacent two pixels, FIG. 7B is a plan view showing an arrangement of scanning electrodes and data electrodes, and FIG. 7C is a plan view showing a display state of the device.

FIG. 8 is a graph schematically showing a temperature-dependent change in relationship between pulse amplitude (V) and transmitted light quantity FIG. 9A is a sectional view showing a structure of a liquid crystal display device used for a pixel shift method and FIG. 9B is a plan view showing an electrode arrangement therefor.

FIGS. 10A-10C constitute a waveform diagram showing a set of signals including scanning signals applied to scanning electrodes (at A and B), and a data signal (at C).

FIGS. 14A-14C are views for illustrating an embodiment, wherein FIG. 14A is a sectional view of vertically adjacent pixels. FIG. 14B is a plan view showing an electrode arrangement, and FIG. 14C is a plan view showing a display state.

FIGS. 16A-16J constitute a time-serial waveform diagram showing a relative timing of various signals used for driving the embodiment of FIGS. 15A-15C.

DESCRIPTION OF THE PREFERRED EMBODIMENTS

Figure 3A:
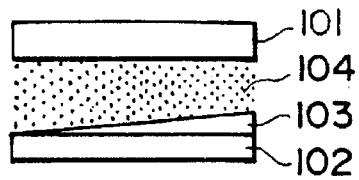
FIGS. 3A-3F are views for illustrating the cell thickness gradient method including a sectional view (FIG. 3A) of a liquid crystal display device and plan views (FIGS. 3B-3F) showing various display states at a pixel when supplied with various voltages (pulse amplitudes).
Figure 3B:
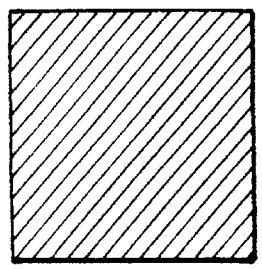
Figure 3C:
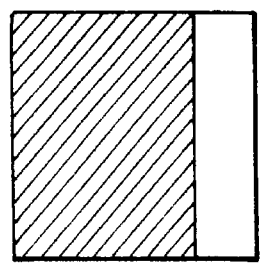
Figure 3D:
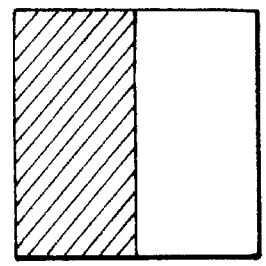
Figure 3E:
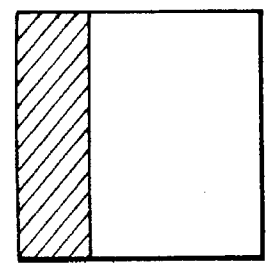
Figure 3F:
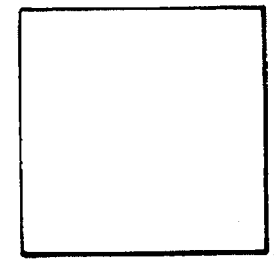
Figure 5A:
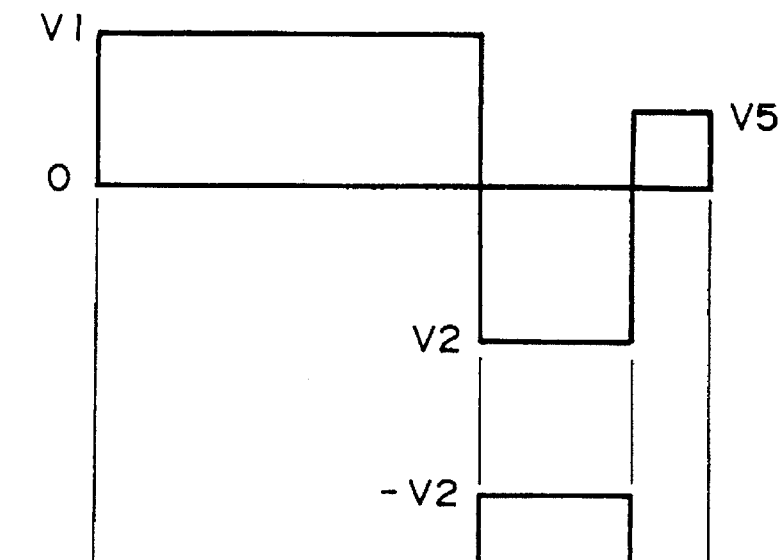
FIGS. 5A-5C constitute a waveform diagram showing a set of signals for driving a liquid crystal display device.
Figure 5B:
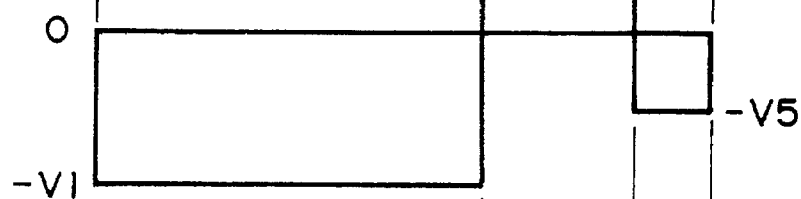
Figure 5C:
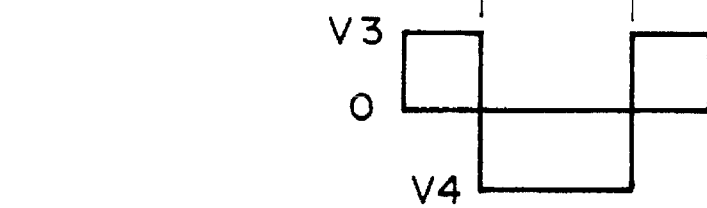
Figure 6:
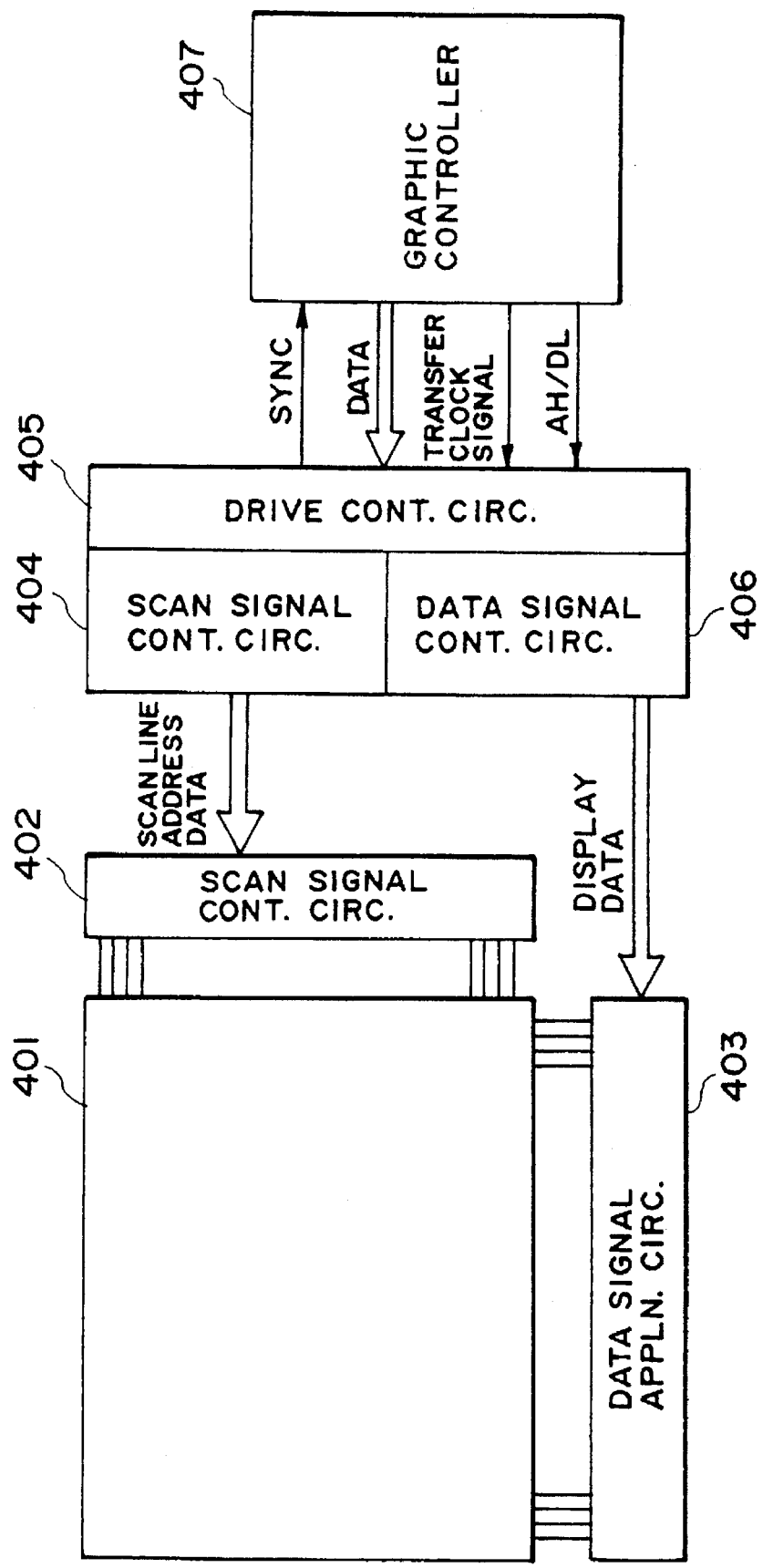
FIG. 6 is a block diagram of a control system for a display device.

Referring to FIG. 6, a liquid crystal display device 401 according to an embodiment of the present invention is connected to a scanning signal application circuit 402 and a data signal application circuit 403, which are further connected sequentially to a scanning signal control circuit 404 and a data signal control circuit 406, a drive control circuit 405, and a graphic controller 407. Data from the graphic controller 407 are inputted via the drive control circuit into the scanning signal control circuit 404 and the data signal control circuit 406, where the data are converted into address data and display data. Further, based on the address data and display data, the scanning signal control circuit 402 and the data signal application circuit 403 generate scanning signals A and B, and a data signal C having waveforms shown in FIGS. 5A-5C, which are applied to scanning electrodes C1, C2, ... and data electrodes S1, S2, ..... In this embodiment, scanning electrodes C1, C2, ... are arranged in specific shapes and scanning signals A and B are appropriately selected so that a black display region (hereinafter called a "black domain") in one pixel and a white display region (called a "white domain") in a pixel adjacent to said one pixel are mutually adjacent to each other. Details thereof will be described hereinafter. Further, in this embodiment, each scanning electrode is shifted upward and downward for each crossing with a display electrode and the address of a scanning electrode is shifted for each line (FIG. 7B), and a corresponding adjustment therefor may be performed by inputting display data to a buffer (not shown) every other data line by the data signal application circuit so as to shift the outputting timing by one horizontal scanning period.

Figures 7A, 7B, 7C:
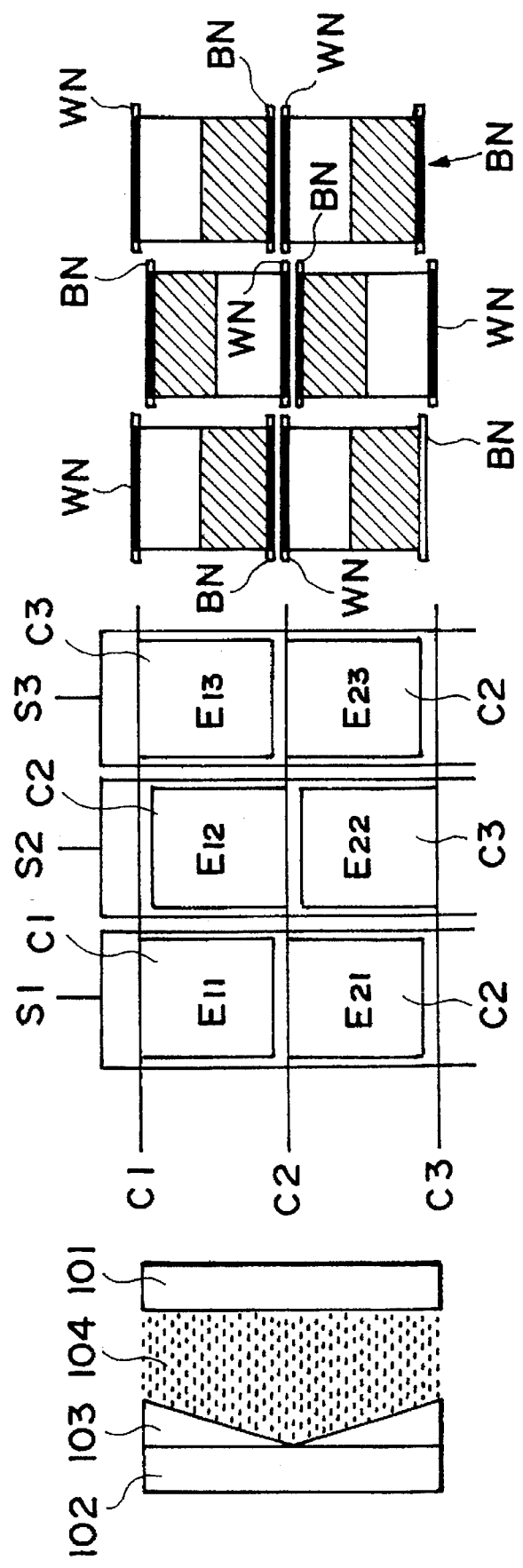

As shown in FIG. 7A, the liquid crystal display device 401 includes a pair of oppositely disposed substrates 101 and 102, of which one substrate 102 is provided with a UV-cured resin layer 103 having a constant gradient within one pixel. As the UV-cured resin layer 103 has a constant gradient, each pixel has a continuously changing thickness of liquid crystal layer 104 which simply shows a monotonously increasing threshold in one direction within each pixel. As shown in FIG. 7A, the gradient of the UV-cured resin layer 103 is made symmetrical for vertically adjacent two pixels (e.g., $E_{11}$ and $E_{21}$ in FIG. 7B), and the gradient is made identical between horizontally adjacent pixels.

On the other hand, on the UV-cured resin layer 103 and the opposite glass substrate 101, scanning electrodes C1 . . . and data electrodes S1 . . . are respectively formed so as to form a large number of pixels $E_{11}$ . . . each at an intersection of the scanning electrodes and data electrodes. Further, a chiral smectic (ferroelectric) liquid crystal 104 is disposed between the glass substrates 101 and 102.

As briefly mentioned before, in this embodiment, scanning electrodes C1 . . . are arranged in a characteristic manner. More specifically, as shown in FIG. 7B, scanning electrodes C1 . . . are disposed to shift up and down for each crossing with one of data electrodes S1, . . . (i.e., in a staggered or zigzag arrangement). Accordingly, three consecutive pixels, $E_{11}$, $E_{12}$ and $E_{13}$, for example, are constituted by combinations of electrodes C1–S1, electrodes C2–S2 and electrodes C1–S3, respectively. Further, in this embodiment, scanning signals A and B shown in FIG. 5 are appropriately selected to be applied to the scanning electrodes C1, . . . . Referring to FIG. 5, the scanning signal A comprises a succession of a black reset pulse and a subsequent selection pulse for writing white, so that a pixel supplied with the signal A is written to display white at a thin liquid crystal layer portion. On the other hand, the scanning signal B comprises a succession of a white reset pulse and a subsequent selection pulse for writing black, so that a pixel supplied with the signal B is written to display black at a thin liquid crystal layer portion. Further, in this embodiment, adjacent scanning electrodes are supplied with different scanning signals, e.g., the scanning electrode C1 is supplied with the scanning signal A and the scanning electrode C2 is supplied with the scanning signal B, so that the pixels $E_{11}$ and $E_{13}$ on the scanning electrode C1 are supplied with the scanning signal A and the pixel $E^{12}$ on the scanning electrode C2 is supplied with the scanning signal B. As a result, at the pixels $E_{11}$ and $E_{13}$ receiving the scanning signal A, portions of a thin liquid crystal layer, i.e., upper peripheral portions, nuclei of white domain and, at the pixel $E_{12}$, a portion of a thin liquid crystal layer, i.e., an upper peripheral portion, forms a nucleus of black domain. Accordingly, in this embodiment, by arranging the scanning electrodes C1 . . . in a zigzag manner as described above, and by supplying canning signals of different polarities (opposite shapes) to adjacent scanning electrodes, the scanning electrodes for mutually adjacent pixels are supplied with pulses of different polarities, whereby sites forming nuclei of black domains (or nuclei of white domain) are prevented from being contiguous to each other, but a site forming a nucleus of black domain and a site forming a nucleus of white domain are alternately disposed as shown in FIG. 7C, wherein a black domain nucleus site is denoted by BN and a white domain nucleus site is denoted by WN.

In the liquid crystal display device 401 constituted in the above-described manner, the scanning electrodes C1, C2 and C3 are supplied with the scanning signals A, B and A respectively and sequentially in the order of C1, C2 and C3. And, in synchronism therewith, the data electrodes S1, S2 and S3 are supplied with a 50%-halftone data signal C. As a result, pixels (e.g., $E_{11}$, $E_{22}$ and $E_{13}$ in FIG. 7B) on the scanning electrodes C1 or C3 are written to display white at thin liquid crystal layer portions, and pixels (e.g., $E_{21}$, $E_{12}$ and $E_{23}$) on the scanning electrode C2 are written to display black at thin liquid crystal layer portions. As a result, the resultant display states of the respective pixels are as shown in FIG. 7C, so that a 50%-halftone can be displayed without a stripe-form continuation of black domains (or white domains), i.e., without giving an appearance of a vertical or horizontal continual line even when the liquid crystal display device is viewed from a position close thereto, thus providing an improved halftone display quality.

In this embodiment, a high-quality halftone display can be accomplished by a simple threshold gradient as described above, and it has become unnecessary to provide a complex threshold gradient by providing concavities in a pixel as in the above-mentioned conventional example. Accordingly, the strict control of production steps and an accompanying decrease in yield can be avoided.

While a particular description has not been made, it is possible to effect a color halftone display by disposing a color filter at each pixel. Also in this instance, by arranging the scanning electrodes C1 . . . and the data electrodes S1 . . . in the described manner and by applying prescribed polarities of pulse voltages, a high-quality halftone display can be effected. While only the case of 50%-halftone (or 50% gradation) display has been described in the above embodiment, this is of course not limitative. An arbitrary gradation level (halftone) can be displayed by changing the areal ratio between the white domain and the black domain in each pixel.

As described above, according to this embodiment, a site forming a nucleus of black display region in one pixel and a site forming a nucleus of white display region in another pixel adjacent to said one pixel are disposed adjacent to each other to prevent continuation of sites forming nuclei of black display regions (or sites forming nuclei of white display regions), so that a liquid crystal display device can be driven to display a halftone without causing a stripe-form continuation of black or white. Accordingly, even if the display device is viewed from a close position, corresponding vertical or horizontal lines cannot be recognized but an improved quality of halftone display can be realized.

Further, according to this embodiment, a high-quality halftone display can be performed by a simple threshold gradient, and a complex threshold gradient is not required as by forming of concavities in a pixel in the conventional method. Accordingly, production control can be simplified and improved production yield can be expected.

Another embodiment now will be described.

Figure 11A:
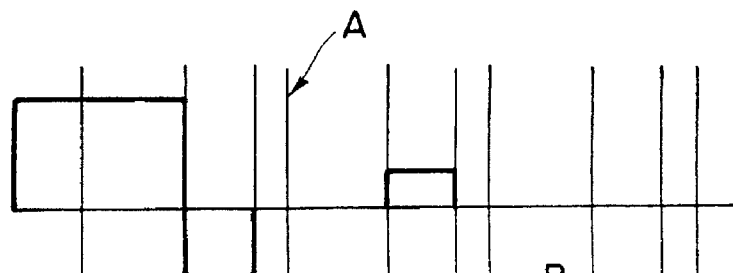
FIGS. 11A-11C constitute a waveform diagram showing a relative timing of various signals including (a) a scanning signal A applied to a scanning electrode c1, (b) a scanning signal B applied to a scanning electrode c2, (c) a data signal C applied to a data electrode s1, (d) a voltage signal applied to a pixel on the scanning electrode c1 (combination of (a) and (c)), and (e) a voltage signal applied to a pixel on the scanning electrode c2 (combination of (b) and (c)).
Figure 11B:
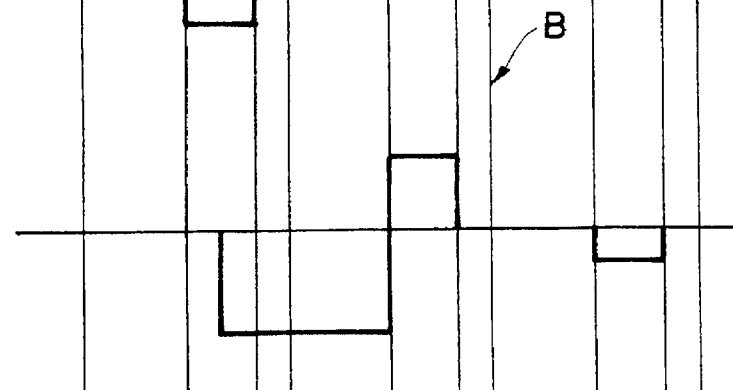
Figure 11C:
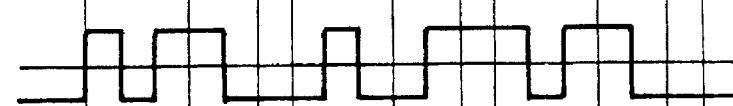
Figure 11D:
Figure 11E:
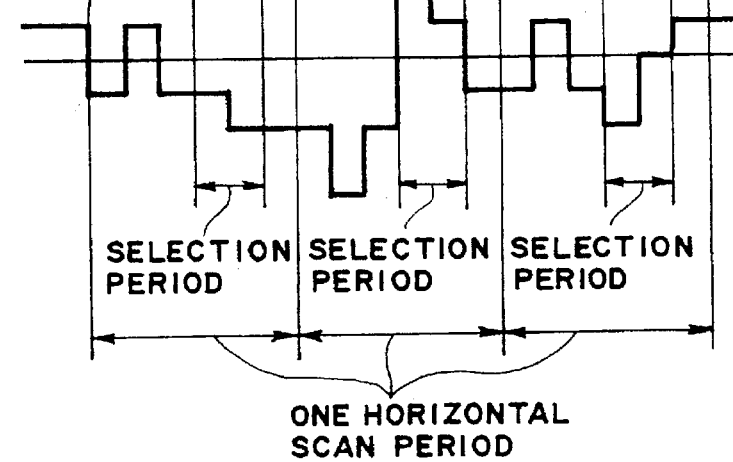
Figures 1, 2, 3, 12B:
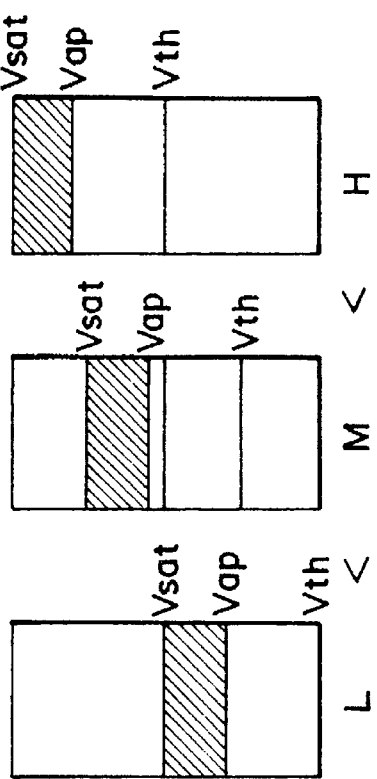
FIGS. 12B-1 through 12B-3 are views for illustrating resultant display states of pixels.

A relationship between pulse amplitude V and transmitted light quantity I as shown in FIG. 1 generally depends on temperature and more generally assumes one as shown in FIG. 8, wherein a curve H represents a relationship at a high temperature and a curve L represents a relationship at a low temperature. As a result, even if an identical pulse voltage (e.g., Vap) is applied, different gradations $I_1$–$I_2$ can be displayed when a certain temperature distribution is present over a display device, so that the resultant display state becomes unstable. Our research and development group has proposed a method (called a "pixel shift method") for solving the problem (JP-A 5-158444). The pixel shift method will now be described with reference to FIGS. 9–12.

Referring to FIG. 9, a liquid crystal display device 100 comprises an oppositely disposed glass substrates 101 and 102, of which one substrate 102 is coated with a UV-cured resin layer 103 having a saw tooth-shaped section. On the UV-cured resin layer 103 and the opposite substrate 101, scanning electrodes C1 ... and data electrodes C1 ... are respectively formed. These electrodes C1 ... and S1 ... are formed in the shape of stripes and disposed to form a large number of pixels $e_{11}$, $e_{12}$, ... each at an intersection thereof as shown in FIG. 9B. The saw tooth pitch of the UV-cured resin layer 103 is set to be identical to a pixel size, and the UV-cured resin layer 103 is formed to have a constant gradient within one pixel. Between the glass substrates 101 and 102, a chiral smectic (ferroelectric) liquid crystal 104 is disposed. Accordingly, the thickness of the liquid crystal layer 104 is caused to have a continuously changing thickness within one pixel due to the UV-cured resin layer 103.

Two types of scanning signals A and B as shown in FIGS. 10A and 10B are applied to the scanning electrodes C1, ... including a scanning signal A which comprises a sequence of a black reset pulse A, a selection pulse A2 for writing white and a compensation pulse A3 for compensating black writing, and another scanning signal B which comprises a sequence of a white reset pulse B1, a selection pulse B2 for writing black and a compensation pulse B3 for compensating white writing. On the other hand, the data electrodes s1, ... are supplied with a data signal as shown at FIG. 10C. The scanning signal A is applied to a scanning electrode C1 and the scanning signal B1 is applied to a scanning electrode C2 at timings as shown at (a) and (b) of FIG. 11. The data signal C is applied to a data electrode at timings as shown at FIG. 11(c). Further, FIG. 11, at (d), shows a voltage waveform applied to a pixel (e.g., $e_{11}$) on the scanning electrode C1 (combination of (a) and (c)), and FIG. 11, at (e), shows a voltage waveform applied to a pixel (e.g., $e_{21}$) on the scanning electrode C2 (combination of (b) and (c)).

Now, an operation of the liquid crystal display device 100 according to the pixel shift method will be described.

Figure 12A:
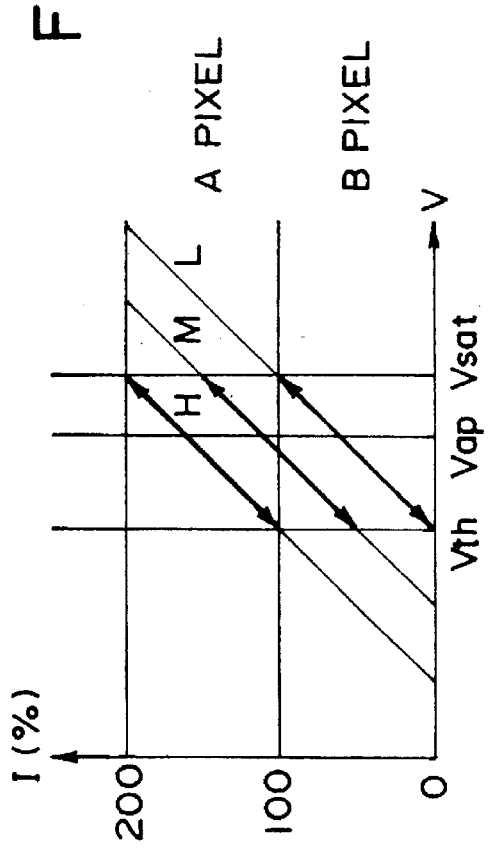
FIG. 12A is a schematic view for illustrating a relationship between pulse amplitude V and transmitted light quantity I in the pixel shift method.
Figure 13:
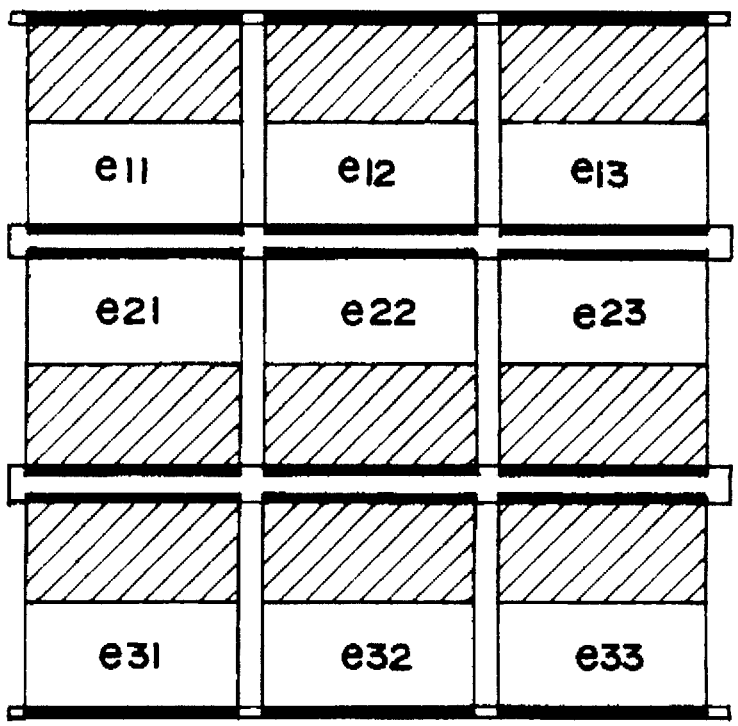
FIG. 13 is a plan view for illustrating a problem accompanying the conventional pixel shift method.

When the scanning electrodes c1 ... and data electrodes s1 ... are supplied with the scanning signals A and B and data signal C, the threshold characteristics of two pixels (e.g., $e_{11}$ and $e_{12}$ in FIG. 9B) may be set so as to be continuous for a data signal as shown in FIG. 12A, wherein reference characters L, M and H (L<M<H) represent states at low, medium and high temperatures, respectively, and a pulse amplitude range of Vth to Vsat corresponds to one data signal. As a result, even if the temperature of the pixels changes in the range of L–M–H, a constant voltage Vap provides a constant display area (inverted area) while the display region is moved as shown in FIGS. 12B-1 through 12 B-3, thus providing a constant halftone level. Further, if the polarity of the reset pulse is inverted for each line, only one writing pulse in data signal is required. This is advantageous in high-speed drive.

Incidentally, when a certain level of halftone (e.g., 50%) is displayed over the entire pixels or pixels in a certain substantial area, white-display portions and black-display portions are contiguous to be in the form of stripes in the substantial area, so that horizontally extending lines can be recognized and the display state cannot be recognized as a halftone display state, when the display device is viewed from a close position. This problem is pronounced when a device having a pixel size of 300 μm×300 μm is viewed from a small distance of 30 cm or below. Incidentally, in the pixel shift method, a display region (e.g., a white display region) moves accordingly to a temperature change, but the above-mentioned problem occurs if the certain substantial area is kept at an identical temperature or accompanied with a uniformly changing temperature.

Accordingly, this embodiment aims at providing a liquid crystal display device capable of a good halftone display even when viewed from a close position while retaining the advantages of the above-mentioned pixel shift method.

According to this aspect of the present invention, there is provided a display device comprising: a pair of oppositely disposed substrates spaced from each other and having thereon a group of scanning electrodes and a group of data electrodes intersecting the scanning electrodes, respectively, and a layer of liquid crystal disposed between the scanning electrodes and data electrodes so as to form a pixel at each intersection of the scanning electrodes and data electrodes and so that a plurality pixels are provided with a continuous threshold characteristic, thereby allowing a constant halftone display regardless of a temperature change;

wherein a site forming a nucleus of a black display region in one pixel and a site forming a nucleus of a white display region in another pixel adjacent to said one pixel are disposed to be adjacent to each other.

In this case, it is preferred that the above-mentioned plurality of pixels providing a continuous threshold characteristic are each supplied with a scanning signal comprising a reset pulse, a selection pulse and a compensation pulse; the compensation pulse of a scanning signal applied to one of the plurality of pixels and the selection pulse of a scanning signal applied to another of the plurality of pixels are both applied in synchronism with a selection period of a data signal applied to the plurality of pixels; and the reset pulses applied to the one and another pixel have mutually opposite polarities.

Further, it is also preferred that the scanning electrodes are arranged in an appropriate shape (e.g., in a zigzag manner so as to shift up and down for each data electrode) so that polarities of pulses applied to scanning electrodes for mutually adjacent pixels are different from each other. Further, it is preferred that mutually adjacent pixel have an identical threshold gradient.

It is also preferred that each pixel is provided with a continuously varying liquid crystal layer thickness so as to have a monotonously increasing threshold gradient in one direction.

It is preferred that the liquid crystal is a chiral smectic liquid crystal preferably having a ferroelectricity.

According to another aspect of the present invention, there is also provided a data transmission apparatus, comprising:

a graphic controller for outputting a data signal and a scanning scheme signal, a scanning signal control circuit for outputting a scanning line address data and a scanning scheme signal, a data signal control circuit for outputting display data and a scanning scheme signal, and a liquid crystal display device as described above.

An embodiment according to this aspect will be described with reference to the drawings.

Figures 14A, 14B, 14C:
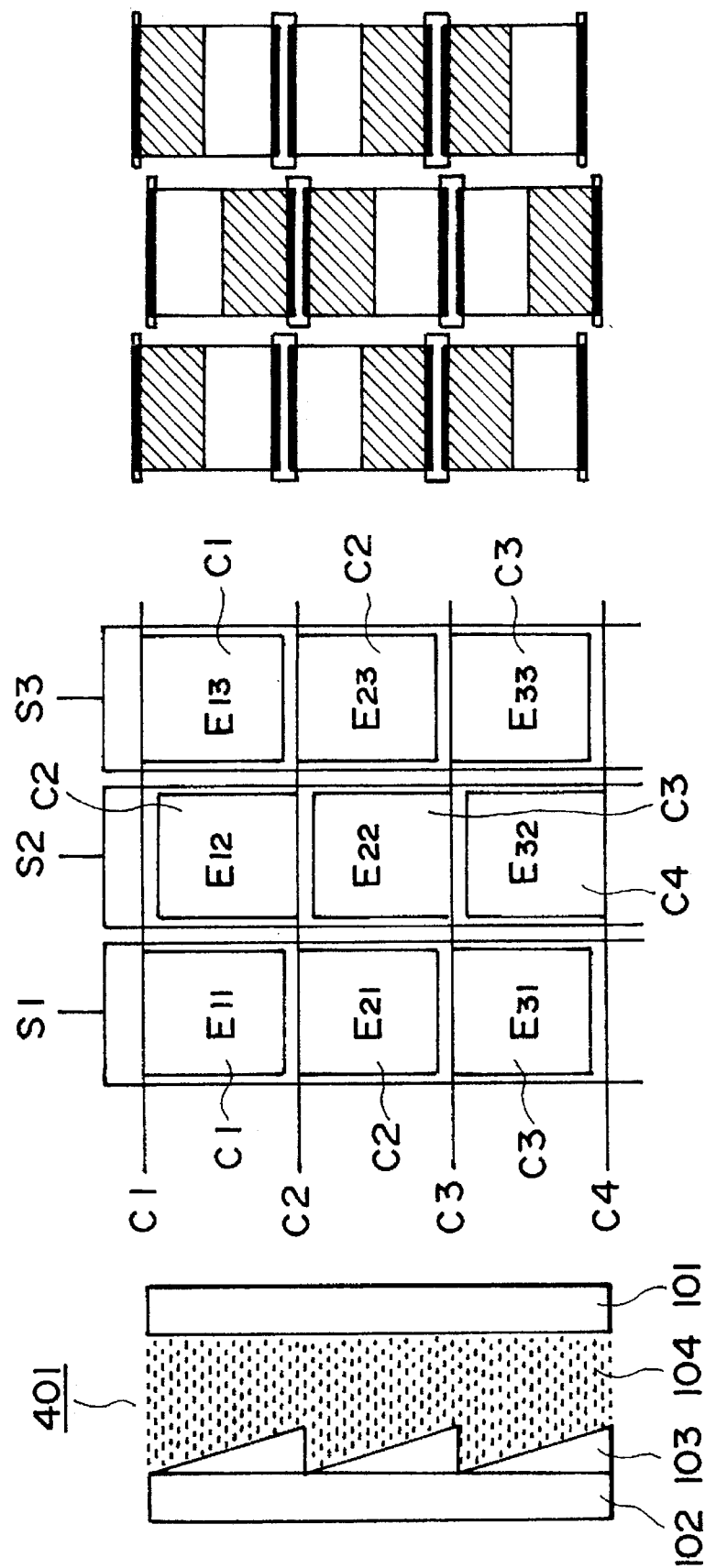

Referring to FIG. 14A, a liquid crystal display device 401, similarly as the structure of the above-mentioned prior art device, comprises glass substrates 101, 102, a UV-cured resin layer 103 and a liquid crystal layer 104 disposed between the substrates 101 and 102. The UV-cured resin layer 103 is formed to have a constant gradient within one pixel, thereby providing a continuous change in liquid crystal layer thickness and a monotonously increasing threshold gradient in one direction. Further, mutually adjacent pixels are set to have an identical threshold gradient. Further, on the UV-cured resin layer 103 and on the other glass substrates 102, a large number of scanning electrodes C1, ... and a large number of data electrodes S1, ... are respectively disposed. Among these, data electrodes S1 ... are in the form of stripes similarly as in the prior art device, but the scanning electrodes C1 ... are shifted up and down for each data electrode so that the address of a scanning electrode is increased or decreased for each data electrode. Accordingly, successively formed pixels $E_{11}$, $E_{12}$ and $E_{13}$ arranged generally in the direction of extension of scanning electrodes are formed by combinations of electrodes S1–C1, electrodes S2–C2, and electrodes S3–C1. The scanning electrodes C1 and C3 are supplied with a scanning signal A, and the scanning electrode C2 is supplied with a scanning signal B having different polarities. Here, the scanning signals are applied to the scanning electrodes in the order of C1→C2→C3→C4. Further, the compensation pulse of the scanning signal A and the selection pulse of the scanning signal B are applied both in synchronism with the selection period of the data signal C. Further, the scanning signals A and B are set to have reset pulses of mutually opposite polarities.

In this embodiment, pixels $E_{11}$, $E_{13}$, $E_{31}$, $E_{22}$, $E_{33}$ ... formed on the scanning electrodes C1 and C3 are supplied with the scanning signal A, and the pixels $E_{21}$, $E_{12}$, $E_{23}$, $E_{32}$ ... formed on the scanning electrodes C2 or C4 ar supplied with the scanning signal B. Accordingly, at the pixels $E_{11}$ . . . receiving the scanning signal A, portions of a thin liquid crystal layer, i.e., upper peripheries of the respective pixels, form nuclei of white domains and, at the pixels $E_{21}$ ... receiving the scanning signal B, portions of a thin liquid crystal layer, i.e., upper peripheries of the respective pixels, form nuclei of black domains. In other words, in this embodiment, by arranging the scanning electrodes C1 ... in a zigzag manner as described above and by supplying scanning signal of different polarities to the scanning electrodes C1 ..., the scanning electrodes for mutually adjacent pixels are supplied with pulses of different polarities, whereby sites forming nuclei of black domains (or nuclei of white domains) are prevented from being contiguous to each other, but a site of nucleus of black domain and a site of nucleus of white domain are alternately disposed as shown in FIG. 14C, wherein a black domain nucleus site is denoted by BN and a white domain nucleus site is denoted by WN. Further, in this embodiment, the compensation pulse of the scanning signal A and the selection pulse of the scanning signal B are both synchronized with the selection period of the data signal C.

As described above, according to this embodiment, the respective pixels are provided with display states as shown in FIG. 14C and a halftone display can be formed without causing a continuation of black domains (or white domains) in the form of stripes, i.e., without giving an appearance of horizontal (or vertical) lines even when the liquid crystal display device is viewed from a close position, thus providing an improved halftone display quality. Further, even if the temperature of the liquid crystal display device 401 is changed locally or entirely, an identical halftone can be displayed by application of an identical voltage. Further, by reversing the polarity of a reset pulse for each scanning line, only a single type of writing data signal is required. This is suitable for a high speed drive.

While a particular description has not been made, it is possible to effect a color halftone display by disposing a color filter at each pixel. Also in this instance, by arranging the scanning electrodes C1 ... and the data electrodes S1 . . . in the described manner and by applying prescribed polarities of pulse voltages, a high-quality halftone display can be effected. While only the case of 50%-halftone (or 50% gradation) display has been described in the above embodiment, this is of course not limitative. An arbitrary gradation level (halftone) can be displayed by changing the areal ratio between the white domain and the black domain in each pixel.

The liquid crystal display device 401 in this embodiment can be driven in a system similar to the one described with reference to FIG. 6.

As described above, according to this embodiment, a site forming a nucleus of black display region in one pixel and a site forming a nucleus of white display region in another pixel adjacent to said one pixel are disposed adjacent to each other to prevent continuation of sites forming nuclei of black display regions (or sites forming nuclei of white display regions), so that a liquid crystal display device can be driven to display a halftone without causing a stripe-form continuation of black or white. Accordingly, even if the display device is viewed from a close position, corresponding vertical or horizontal lines cannot be recognized but an improved quality of halftone display can be realized.

Further, even if the temperature of the liquid crystal display device is changed, an identical halftone can be displayed by application of an identical voltage. Further, by reversing the polarity of a reset pulse for each scanning line, only a single type of writing data signal is required, as suitable for a high speed drive.

The present invention further aims at providing a liquid crystal display device providing substantially equal halftones at plural pixels and also capable of providing a good halftone display even when viewed from a close position while retaining the advantages of the above-mentioned pixel shift method.

According to this aspect of the present invention, there is provided a display device comprising:

a pair of oppositely disposed substrates spaced from each other and having thereon a group of scanning electrodes and a group of data electrodes intersecting the scanning electrodes, respectively, and a layer of optical modulation substance disposed between the scanning electrodes and data electrodes so as to form a pixel at each intersection of the scanning electrodes and data electrodes and so that a plurality of pixels are provided with a continuous threshold characteristic to allow a halftone display, a first pixel is constituted at an intersection of a first scanning electrode and a first data electrode, and a second pixel adjacent to said first pixel is constituted at an intersection of a second scanning electrode and a second data electrode adjacent to said first data electrode, pulses of different polarities are applied to the first and second scanning electrodes to display substantially equal halftones at the first and second pixels, a site forming a nucleus of a black display region in said first pixel and a site forming a nucleus of a white display region in said second pixel are disposed adjacent to each other, a third pixel is disposed on the first data electrode and adjacent to the first pixel so as to have a threshold characteristic which is continuous to that of the first pixel, and a fourth pixel is disposed on the second data electrode and adjacent to the second pixel so as to have a threshold characteristic which is continuous to that of the second pixel, and the third and fourth pixels are disposed on third and fourth scanning electrodes, respectively different from said first and second scanning electrodes.

In this case, it is preferred that each scanning electrode is supplied with a scanning signal comprising a reset pulse, a selection pulse and a compensation pulse, the compensation pulse of a scanning signal applied to the first or second pixel and the selection pulse of a scanning signal applied to the third or fourth pixel are both synchronized with a selection period of a data signal applied to these pixels, and these pixels are set to have a continuous threshold characteristic so as to display a constant halftone regardless of a temperature change.

It is also preferred that the scanning signals applied to the first and fourth pixels are set to have reset pulses, selection pulses and compensation pulses of a mutually identical polarity, respectively, the scanning signals applied to the second and third pixels are set to have reset pulses, selection pulses and compensation pulses of a mutually identical polarity, respectively, the scanning signals applied to the first and fourth pixels and to the second and third pixels are set to have reset pulses, selection pulses and compensation pulses of a mutually opposite polarities, respectively.

It is also preferred that the liquid crystal is a chiral smectic liquid crystal preferably having a ferroelectricity.

According to another aspect of the present invention, there is also provided a data transmission apparatus, comprising:

a graphic controller for outputting a data signal and a scanning scheme signal, a scanning signal control circuit for outputting a scanning line address data and a scanning scheme signal, a data signal control circuit for outputting display data and a scanning scheme signal, and a liquid crystal display device as described above.

An embodiment according to this aspect will be described with reference to the drawings.

Figures 15A, 15B, 15C:
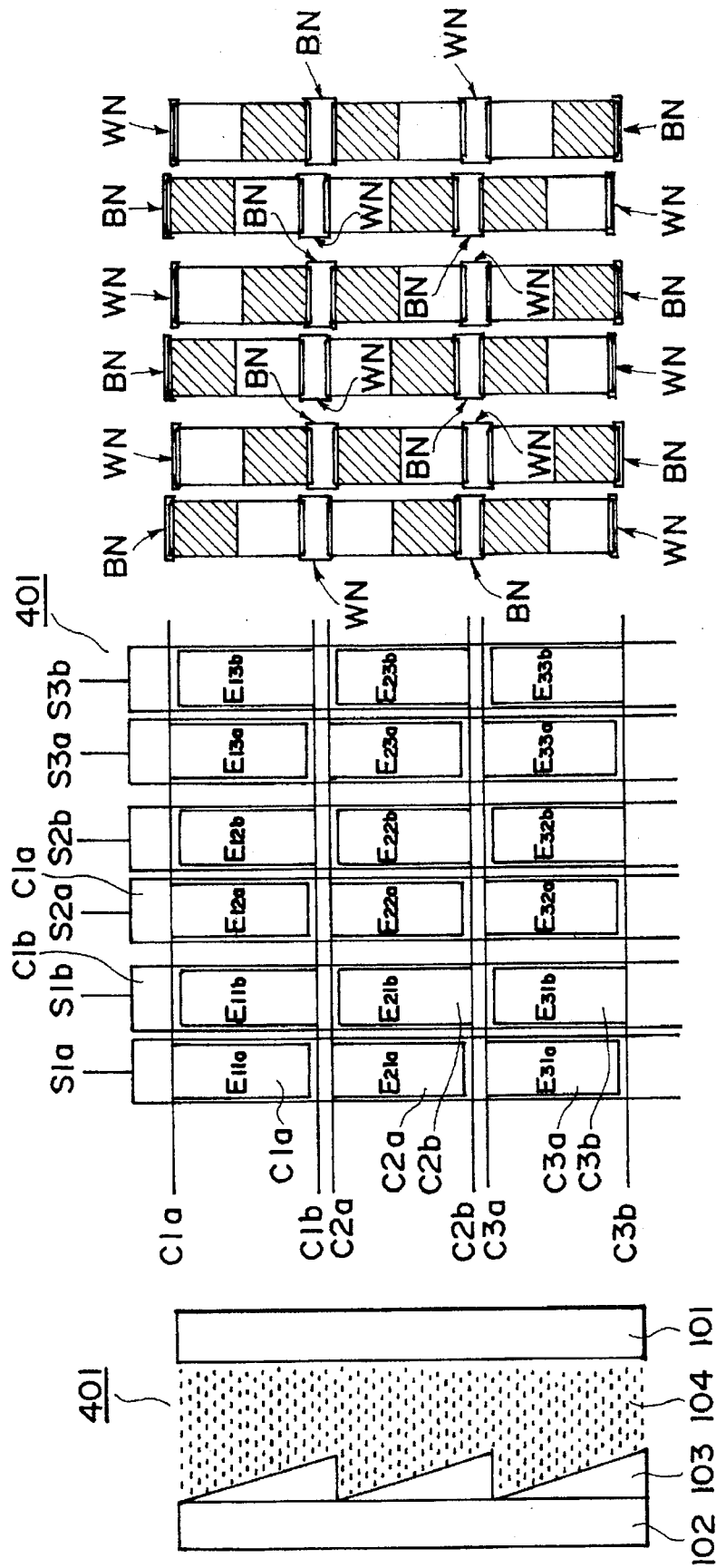
FIGS. 15A-15C are views similar to FIGS. 14A-14C, for illustrating another embodiment.

Referring to FIG. 15A, a liquid crystal display device 401 comprises glass substrates 101, 102, a UV-cured resin layer 103 formed on the substrate 102, and a liquid crystal layer disposed between the substrates.

On the UV-cured resin layer 103 and on the other substrate 101, a large number of scanning electrodes C1a, C1b, C2a ... are a large number of data electrodes S1a, S1b, S2a ... are respectively formed so as to form pixels $E_{11a}$, $E_{11b}$ .... at each intersection of the scanning electrodes C1a, C1b ... and data electrodes S1a, S1b ....

The data electrodes S1a, S1b, S2a ... are in the form of stripes as in a conventional device, but the scanning electrodes C1a ... are arranged in a special shape, i.e., in a thinned comb with every other tooth removed. More specifically, as shown in FIG. 15(b), a first scanning electrode C1a for example constitutes pixels (first pixels), $E_{11a}$, $E_{12a}$, $E_{13a}$ ... only with every other data electrode (first electrode) S1a, S2a, S3a ... and other pixels (second pixels) $E_{11b}$, $E_{12b}$, $E_{13b}$ ... disposed between the first pixels are formed on another (second scanning electrode C1b and other data electrodes B (second data electrodes) S1b, S2b, .....

Accordingly, a series of pixels $E_{11a}$, $E_{11b}$, $E_{12a}$, $E_{12b}$, $E_{13a}$, $E_{13b}$ ... aligned horizontally or generally in a direction of extension of the scanning electrodes C1a and C2b are respectively composed by electrodes C1a–S1a, electrodes C1b–S1b, electrodes C1a–S2a, electrodes C1b–S2b, electrodes C1a–S3a, electrodes C1b–S3b .... Further, pixels in each pair of pixels $E_{11a}$ and $E_{11b}$, pixels $E_{12a}$ and $E_{12b}$ ... are designed to display equal halftones. More specifically, each of pixels $E_{11a}$ and $E_{11b}$ functions as a sub-pixel, and an assembly of these sub-pixels constitute a display region displaying a single halftone. Further, similarly as in the above embodiments, the UV-cured resin layer 103 is formed to have a single gradient within one pixel, thus providing a monotonously increasing threshold gradient in one direction. Furthermore, the pixels $E_{11a}$, $E_{11b}$, $E_{12a}$, $E_{12a}$ ... aligned to form a single horizontal row are caused to have a monotonously increasing threshold gradient in an identical direction.

On the other hand, other pixels (third pixels) $E_{21a}$, $E_{22a}$, $E_{23a}$ ... are at intersections of data electrodes S1a, S2a, S3a ... and a scanning electrode C2a, and other pixels (fourth pixels) $E_{21b}$, $E_{22b}$, $E_{23}$ ... are formed at intersections of data electrodes S1b, S2b, S3b ... and a scanning electrode C2b. As a result, the first pixels $E_{11a}$, $E_{12a}$, $E_{13a}$ ... and the third pixels $E_{21a}$, $E_{22a}$, $E_{23a}$ ... are adjacent to each other along the data electrodes S1a, S2a, S3a ..., respectively. Further, the second pixels $E_{11b}$, $E_{12b}$, $E_{13b}$ ... and fourth pixels $E_{21b}$, $E_{22b}$, $E_{23b}$ ... are adjacent to each other along the data electrodes S1b, S2b, S3a ....

Then, manners of application of signals to these electrodes C1a ... and S1a ... will be described with reference to FIGS. 16(a)–(f).

Figure 16A:
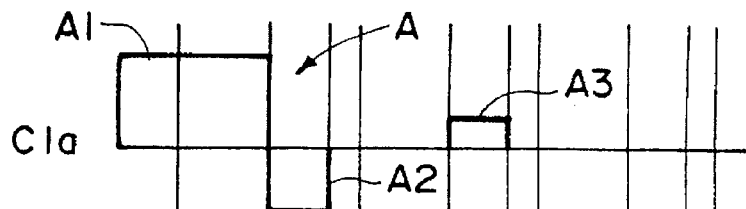
Figure 16B:
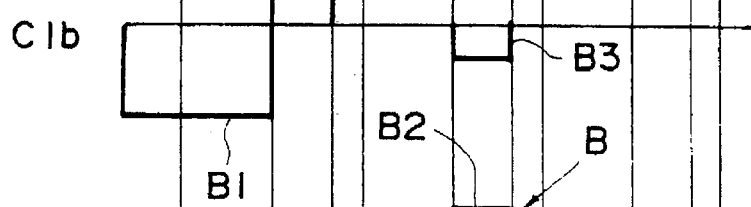

In this embodiment, the scanning electrodes C1a, C2b, C3a ... are supplied with a scanning signal A shown in FIG. 10 or FIG. 16(a), and the scanning electrodes C1b, C2b, C3b ... are supplied with a scanning signal B shown in FIG. 10 or FIG. 16(b). As a result, the first pixels $E_{11a}$, $E_{12a}$, $E_{13a}$ ... and the fourth pixels $E_{21b}$, $E_{22b}$, $E_{23b}$ ... are supplied with an identical waveform (polarities) of the scanning signal A. On the other hand, the second pixels $E_{11b}$, $E_{12b}$, $E_{13b}$ ... and the third pixels $E_{21a}$, $E_{22a}$, $E_{23}$ ... are supplied with another identical form of the scanning signal B.

Further, the application of the scanning signal A to the scanning electrode C1a (FIG. 16(a)) is synchronized with the application of the scanning signal B to the scanning electrode C1b (FIG. 16(b)). Further, after a prescribed period, the scanning signal B is applied to the scanning electrode C2a in synchronism with the application of the scanning signal A to the scanning electrode C2b (FIG. 16(c) and (d)).

Figure 16C:
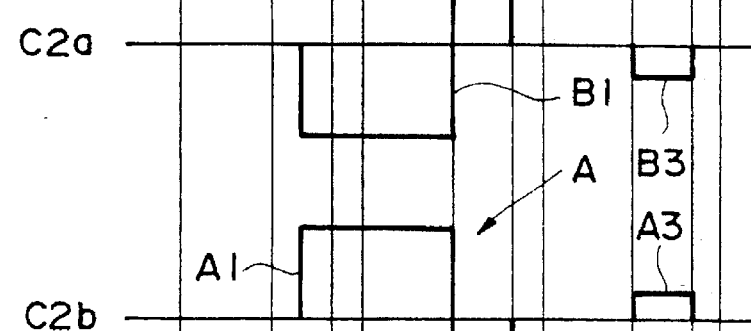
Figure 16D:
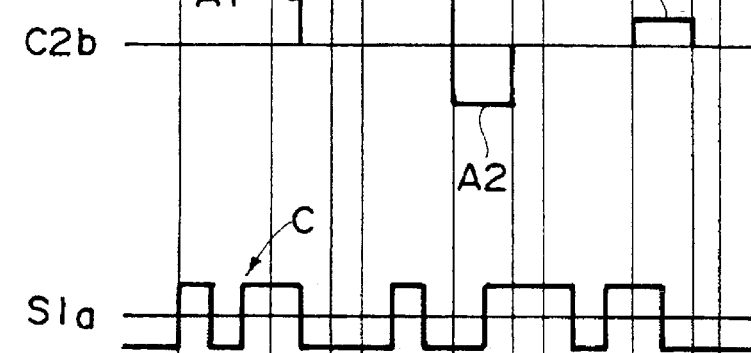
Figure 16E:
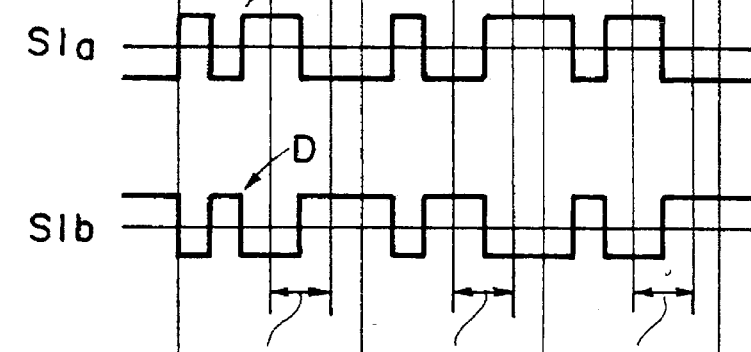
Figure 16F:
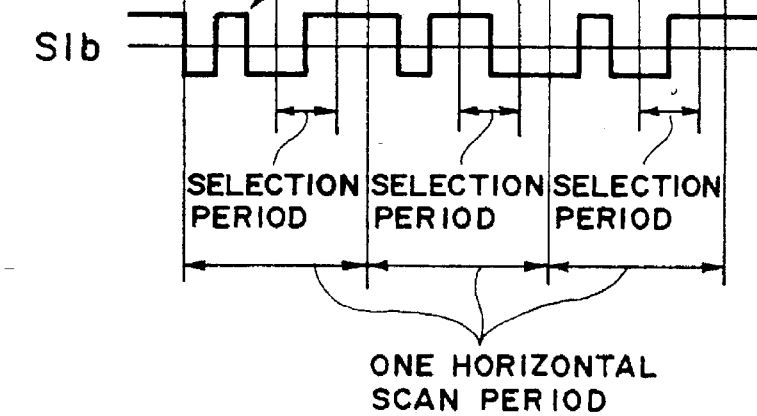

On the other hand, as is understood from a comparison of FIG. 16(a) and (c), the compensation pulse A3 of the scanning signal A applied to the scanning electrode C1a (i.e., to the first pixels $E_{11a}$ ... ) and the selection pulse B2 of the scanning signal B applied to the scanning electrode C2a (i.e., to the third pixels $E_{21a}$ ... ) are synchronized with the selection period of the data signal C applied to these pixels (FIG. 16(c)). Similarly as is understood from a comparison of FIGS. 16(b) and (f). The compensation pulse B3 of the scanning signal B applied to the scanning electrode C1b (i.e., to the second pixels $E_{11b}$ ... ) and the selection pulse A2 of the scanning signal A applied to the scanning electrode C2b (i.e., to the fourth pixels $E_{21b}$ ...) are synchronized with the selection period of the data signal D applied to these pixels (FIG. 16(f)). As a result, the first pixels $E_{11a}$ ... and the third pixels 21a ... are caused to have a continuous threshold characteristic. On the other hand, the second pixels $E_{11b}$ ... and the fourth pixels $E_{21b}$ ... are caused to have another continuous threshold characteristic. As a result, each pair of the first and third pixels and each pair of the second and fourth pixels can display a desired constant halftone regardless of a temperature change.

Now, one first pixel $E_{11}$ is taken for example. The first pixel is constituted by the scanning electrode C1a and the data electrode S1a and is supplied with a voltage waveform F (FIG. 16(g)) obtained by a combination of the scanning signal A and the data signal C. The voltage waveform F comprises a first pulse F1 (obtained by a combination of the reset pulse A1 and the data signal C), a second pulse F2 (obtained by a combination of the selection pulse A2 and the data signal C) and a third pulse F3 (obtained by a combination of the compensation pulse A3 and the data pulse C). Accordingly, the first pixel $E_{11a}$ is completely written (reset) into black by the first pulse F1, then written into white depending on a desired gradation by the subsequent pulse F2 and further written toward black by the pulse F3, as desired.

Further, at the same time, a second pixel $E_{11b}$ disposed adjacent to the first pixel $E_{11a}$ is supplied with a voltage waveform G (FIG. 16(b)) obtained by a combination of the scanning signal B and the data signal D. The voltage waveform G comprises a first pulse G1 (obtained by a combination of the reset pulse B1 and the data signal D), a second pulse G2 (obtained by a combination of the selection pulse B2 and the data signal D) and a third pulse G3 (obtained by a combination of the compensation pulse B3 and the data pulse D). Accordingly, the second pixel $E_{11b}$ is completely written (reset) into white by the first pulse G1, then written into black depending on a desired gradation by the subsequent pulse G2 and further written toward white by the pulse G3, as desired.

In this embodiment, pixels $E_{11a}$, $E_{12a}$, ... formed on the scanning electrode C1a is supplied with the scanning signal A, and the pixels $E_{11b}$, $E_{12b}$, ... formed on the scanning electrode C1b is supplied with the scanning signal B. Accordingly, at the pixels $E11_a$, $E_{12a}$ ... receiving the scanning signal A, portions of a thin liquid crystal layer, i.e., lower peripheries of the respective pixels, form nuclei of white domains and, at the pixels $E_{11b}$, $E_{12b}$ ... receiving the scanning signal B, portions of a thin liquid crystal layer, i.e., lower peripheries of the respective pixels, form nuclei of black domains. In other words, in this embodiment, by arranging the scanning electrodes C1a, C1b ... in a thinned comb arrangement as described above and by supplying scanning signal of different polarities to the scanning electrodes C1a and C1b ..., the scanning electrodes for mutually adjacent pixels are supplied with pulses of different polarities, whereby sites forming nuclei of black domains (or nuclei of white domains) are prevented from being contiguous to each other, but a site of nucleus of black domain and a site of nucleus of white domain are alternately disposed in a horizontal low as shown in FIG. 15C, wherein a black domain nucleus site is denoted by BN and a white domain nucleus site is denoted by WN.

As described above, according to this embodiment, one gradation is designed to be displayed by a pair of pixels (e.g., a combination of a first pixel $E_{11a}$ and a second pixel $E_{11b}$) and, in these pairs of pixels, a nucleus of black domain and a nucleus of white domain are caused to be present alternately, so that black display portions and white display portions are dispersed with each other to provide an improved halftone display quality (FIG. 15(c)). Further, in a horizontal row of pixels $E_{11a}$, $E_{11b}$, $E_{12b}$, $E_{13a}$, $E_{13b}$ .... nuclei of black domains and nuclei of white domains are alternately present. Accordingly, a halftone display can be formed without causing a continuation of black domains (or white domains) in the form of stripes, i.e., without giving an appearance of horizontal (or vertical) line even when the liquid crystal display device is viewed from a close position, thus providing an improved halftone display quality.

Further, as the first pixels $E_{11a}$ ... and the third pixels $E_{21a}$ ... have a continuous threshold characteristic, and the second pixels $E_{11}$ ... and the fourth pixel $E_{21b}$ ... have a continuous threshold characteristic, a constant halftone display can be effected regardless of a temperature change according to the pixel shift method.

Further, the first pixels $E_{11a}$ ..., the second pixels $E_{11b}$ ..., the third pixels $E_{21a}$ ... and the fourth pixels $E_{21b}$ ... are all constituted by different scanning electrodes. Accordingly, even if it has become necessary to write in particular pixels (e.g., pixels $E_{11a}$ and $E_{11b}$) after writing in a substantial area of pixels, the particular pixels can be easily rewritten by applying scanning signals to only scanning electrodes constituting the particular scanning electrodes (e.g., scanning electrodes C1a and C1b) and without applying scanning signals to other scanning electrodes. In other word, such a partial rewrite operation can be performed easily.

While a particular description has not been made, it is possible to effect a color halftone display by disposing a color filter at each pixel. Also in this instance, by arranging the scanning electrodes C1a, C1b ... and the data electrodes S1a, S1b ... in the described manner and by applying prescribed polarities of pulse voltages, a high-quality halftone display can be effected. While only the case of 50%-halftone (or 50% gradation) display has been described in the above embodiment, this is of course not limitative. An arbitrary gradation level (halftone) can be displayed by changing the areal ratio between the white domain and the black domain in each pixel.

The liquid crystal display device 401 in this embodiment can be driven in a system similar to the one described with reference to FIG. 6.

As described above, according to this embodiment, a site forming a nucleus of black display region in a first pixel and a site forming a nucleus of white display region in a second pixel adjacent to the first pixel are disposed adjacent to each other to prevent continuation of sites forming nuclei of black display regions (or sites forming nuclei of white display regions), so that a liquid crystal display device can be driven to display a halftone without causing a stripe-form continuation of black or white. Accordingly, even if the display device is viewed from a close position, corresponding vertical or horizontal lines cannot be recognized but an improved quality of halftone display can be realized. Further, a pair of first and second pixels are designed to display a single gradation and, in such pairs of pixels, a black domain nucleus and a white domain nucleus are present alternately, black display portions and white display portions are dispersed to provide an improved halftone display quality.

Further, as the first pixels and the third pixels have a continuous threshold characteristic, and the second pixels and the fourth pixel have a continuous threshold characteristic, a constant halftone display can be effected regardless of a temperature change according to the pixel shift method.

Further, the first pixels, the second pixels, the third pixels and the fourth pixels are all constituted by different scanning electrodes. Accordingly, even if it has become necessary to locally write in particular pixels after writing in a substantial area of pixels, the particular pixels can be easily rewritten by applying scanning signals to only scanning electrodes constituting the particular scanning electrodes and without applying scanning signals to other scanning electrodes. Thus, a partial rewrite operation can be performed easily.

A further embodiment of the present invention will now be described.

Figure 17:
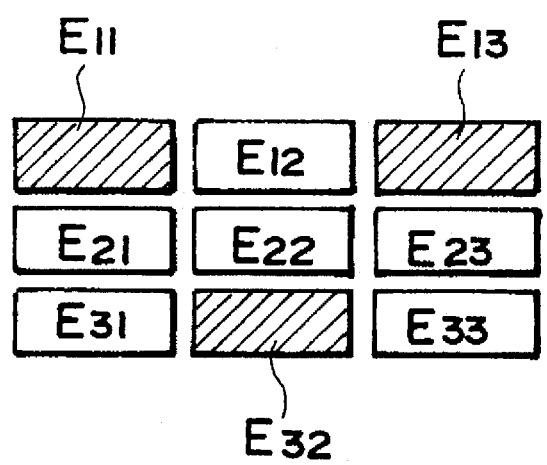
FIG. 17 is a plan view showing an arrangement of pixels according to another embodiment.

FIG. 17 is a plan view of substantially three pixels, each comprising three sub-pixels ($E_{11}$, $E_{21}$, $E_{31}$), ($E_{12}$, $E_{22}$, $E_{32}$) or ($E_{13}$, $E_{23}$, $E_{33}$). Each pixel can display four gradation as a combination of states of three sub-pixels. In the leftmost (column) pixel, three sub-pixels $E_{31}$, $E_{21}$ and $E_{11}$ may be sequentially turned-on in this order to effect a gradational display ranging from a black (all dark) state to a white (all bright) state. In the middle (column) pixel, unlike both side pixels, the sub-pixels $E_{12}$, $E_{22}$ and $E_{32}$ may be sequentially turned on in this order to effect a gradational display. In this case, each sub-pixel can effect only a binary display of on or off, and this is different from a gradational display according to an analog modulation as in the previous embodiments. However, in this embodiments, sites forming nuclei of black display regions are sub-pixels $E_{11}$, $E_{32}$ and $E_{13}$, and sites forming nuclei of white display regions are sub-pixels $E_{21}$, $E_{12}$ and $E_{33}$, so that a white display region nucleus and a black display region nucleus are arranged to be adjacent to each other.

As a result, the occurrence of an undesirable or false contour or pattern liable to occur in displaying an identical level of halftone over a wide area of panel can be obviated similarly as in the previous embodiments.

What is claimed is:

1. A display device comprising: a pair of oppositely disposed substrates spaced from each other and having thereon a group of scanning electrodes and a group of data electrodes intersecting the scanning electrodes, respectively, and a layer of optical modulation substance disposed between the scanning electrodes and data electrodes so as to form a pixel at each intersection of the scanning electrodes and data electrodes and so that a plurality of pixels are provided with a continuous threshold characteristic to allow a halftone display, a first pixel is constituted at an intersection of a first scanning electrode and a first data electrode, and a second pixel adjacent to said first pixel is constituted at an intersection of a second scanning electrode and a second data electrode adjacent to said first data electrode, pulses of different polarities are applied to the first and second scanning electrodes to display substantially equal halftones at the first and second pixels, a site forming a nucleus of a black display region in said first pixel and a site forming a nucleus of a white display region in said second pixel are disposed adjacent to each other, a third pixel is disposed on the first data electrode and adjacent to the first pixel so as to have a threshold characteristic which is continuous to that of the first pixel, and a fourth pixel is disposed on the second data electrode and adjacent to the second pixel so as to have a threshold characteristic which is continuous to that of the second pixel, and the third and fourth pixels are disposed on third and fourth scanning electrodes, respectively different from said first and second scanning electrodes.

2. A display device according to claim 1, wherein each scanning electrode is supplied with a scanning signal comprising a reset pulse, a selection pulse and a compensation pulse, the compensation pulse of a scanning signal applied to the first or second pixel and the selection pulse of a scanning signal applied to the third or fourth pixel are both synchronized with a selection period of a data signal applied to these pixels, and these pixels are set to have a continuous threshold characteristic so as to display a constant halftone regardless of a temperature change.

3. A display device according to claim 2, wherein the scanning signals applied to the first and fourth pixels are set to have reset pulses, selection pulses and compensation pulses of a mutually identical polarity, respectively, the scanning signals applied to the second and third pixels are set to have reset pulses, selection pulses and compensation pulses of a mutually identical polarity, respectively, the scanning signals applied to the first and fourth pixels and to the second and third pixels are set to have reset pulses, selection pulses and compensation pulses of mutually opposite polarities, respectively.

4. A display device according to claim 1, wherein said optical modulation substance comprises a liquid crystal.

5. A display device according to claim 4, wherein said liquid crystal is a chiral smectic liquid crystal.

6. A data transmission apparatus, comprising:

a graphic controller for outputting a data signal and a first scanning scheme signal;

a scanning signal control circuit for outputting a scanning line address data and a second scanning scheme signal;

a data signal control circuit for outputting display data and a third scanning scheme signal, and a display device according to any one of claims 1 to 5.

7. An optical modulation apparatus, comprising:

(A) an optical modulation device comprising a pair of substrates having thereon a plurality of scanning electrodes and a plurality of data electrodes, and an optical modulation substance disposed between the substrates so as to form a matrix of pixels each at an intersection of the scanning electrodes and the data electrodes, wherein:

the matrix of pixels are disposed in a plurality of rows and a plurality of columns, a row of pixels includes a first pixel and a second pixel neighboring the first pixel, the first pixel is disposed at an intersection of a first scanning electrode and a first data electrode, the second pixel is disposed at an intersection of a second scanning electrode and a second data electrode, and the first and second pixels have an identical direction of threshold gradient; and (B) a circuit for applying scanning signals of mutually opposite polarities to the first and second scanning electrodes, respectively.

8. A display device according to claim 7, wherein said liquid crystal is a chiral smectic liquid crystal.

9. An apparatus according to claim 7, wherein said threshold gradient is provided by disposing the optical modulation substance in a varying thickness within a pixel.

10. An apparatus according to claim 7, wherein the threshold gradient is provided by forming a varying gap between the substrates within each pixel.

11. An apparatus according to claim 7, wherein a third pixel and a fourth pixel neighboring the third pixel are disposed on a row adjacent to the row including the first and second pixels, and the third pixel is disposed on a column in common with the first pixel, and the fourth pixel is disposed on a column in common with the second pixel.

12. An apparatus according to claim 11, wherein the third pixel is disposed at an intersection of the second scanning electrode and the first data electrode.

13. An apparatus according to claim 11, wherein the fourth pixel is disposed at an intersection of a third scanning electrode and the second data electrode.

14. An apparatus according to claim 11, wherein:

a fifth pixel is disposed next to the second pixel on the row of the first and second pixels and is disposed at an intersection of the first scanning electrode and a third data electrode, and a sixth pixel is disposed next to the fourth pixel on the row of the third and fourth pixels and is disposed at an intersection of the second scanning electrode and the third data electrode.

15. An apparatus according to claim 11, wherein the third and fourth pixels have an identical direction of threshold gradient which is opposite to that of the first and second pixels.

16. An apparatus according to claim 11, wherein the third and fourth pixels have an identical direction of threshold gradient which is identical to that of the first and second pixels.

17. An apparatus according to claim 11, wherein:

the first and second pixels are simultaneously supplied with scanning signals of mutually opposite polarities, and the third and fourth pixels are simultaneously supplied with scanning signals of mutually opposite polarities.

18. An apparatus according to claim 7, wherein one of the scanning signals comprises a pulse train including a first pulse of first polarity, a pulse of second polarity and a second pulse of the first polarity.

19. An apparatus according to claim 7, wherein the optical modulation substance comprises a liquid crystal.

20. An apparatus according to claim 19, wherein the liquid crystal is a chiral smectic liquid crystal.

21. An apparatus according to claim 7, wherein each pixel displays a halftone based on an areal ratio between white and black display regions in the pixel depending on a signal applied to the first or second data electrode.

22. An apparatus according to claim 7, wherein each pixel has a threshold gradient which increases monotonously in one directions.

23. An apparatus according to claim 7, wherein when the first and second pixels each form a display state based on a white display region and a black display region, the black display region of the first pixel and the white display region of the second pixel are adjacent to each other, and the white display region of the first pixel and the black display region of the second pixel are adjacent to each other.

* * * * *

UNITED STATES PATENT AND TRADEMARK OFFICE
CERTIFICATE OF CORRECTION

PATENT NO. : 5,638,195

DATED : June 10, 1997

INVENTOR(S): KAZUNORI KATAKURA ET AL.

It is certified that error appears in the above-identified patent and that said Letters Patent is hereby corrected as shown below:

COLUMN 1

Line 20, "achieve" should read --to achieve--.

COLUMN 4

Line 8, "quantity" should read --quantity (I).--.
   Line 17, "11A-11C" should read --11A-11E--.

COLUMN 7

Line 37, "signal A" should read --signal as shown at Fig. 10A--.
   Line 40, "C" should read --as shown at Fig. 10C--.

COLUMN 8

Line 25, "plurality" should read --plurality of--.
   Line 48, "pixel" should read --pixels--.

COLUMN 9

Line 36, "at" should read --are--.

UNITED STATES PATENT AND TRADEMARK OFFICE
CERTIFICATE OF CORRECTION

PATENT NO. : 5,638,195

DATED : June 10, 1997

INVENTOR(S) : KAZUNORI KATAKURA ET AL.

It is certified that error appears in the above-identified patent and that said Letters Patent is hereby corrected as shown below:

COLUMN 11

Line 35, "of a" should read --of--.

COLUMN 12

Line 15, "constitute" should read --constitutes--.
Line 20, "$E_{12a}$" (second occurrence) should read --$E_{12b}$--.

COLUMN 14

Line 3, "$E_{13b}$...." should read --$E_{13b}$...,--.
Line 27, "word," should read --words,--.

COLUMN 15

Line 14, "gradation" should read --gradations--.
Line 24, "embodiments" should read --embodiment--.

UNITED STATES PATENT AND TRADEMARK OFFICE
CERTIFICATE OF CORRECTION

PATENT NO. : 5,638,195

DATED : June 10, 1997

INVENTOR(S): KAZUNORI KATAKURA ET AL.

It is certified that error appears in the above-identified patent and that said Letters Patent is hereby corrected as shown below:

<u>COLUMN 18</u>

Line 21, "directions." should read --direction.--

Signed and Sealed this

Sixth Day of January, 1998

Attest:

BRUCE LEHMAN

*Attesting Officer*    *Commissioner of Patents and Trademarks*